United States Patent Office 3,107,244
Patented Oct. 15, 1963

3,107,244
PRODUCTION OF CYANURIC ACID
James A. Robertson, Levittown, Pa., assignor to FMC Corporation, a corporation of Delaware
No Drawing. Filed Feb. 28, 1961, Ser. No. 92,165
7 Claims. (Cl. 260—248)

This invention relates to the production of cyanuric acid by heating urea, and more particularly to the recovery of the cyanuric acid from the reaction products.

One method for producing cyanuric acid is by heating urea in a kiln maintained at about 300° C. at atmospheric pressure. The heating is carried out in the absence of substantial amounts of air. A product mixture comprising about 75% cyanuric acid, 25% ammelide, and minor amounts of ammonium salts is obtained. Cyanuric acid is recovered from the product mixture by digesting the mixture in a mineral acid bath. Any strong mineral acid may be employed in concentrations of about five Normal, but sulfuric acid and hydrochloric acid are the two most preferred. The digestion is normally carried out on the order of about four hours at temperatures of about 105° C. The procedure for carrying out this process is fully described in U.S. Patent No. 2,943,088, issued to R. H. Westfall on June 28, 1960.

At the conclusion of the digestion step, the digestion liquor containing the cyanuric acid is cooled to room temperature, and the precipitated cyanuric crystals are filtered from the digestion liquor, in a series of filtrations, and washed with water at room temperature. The precipitation of the cyanuric acid from the digestion liquor is carried out at temperatures below 50° C., and preferably at room temperature, in order to limit the quantity of cyanuric acid which remains in solution, and to facilitate normal handling in the plant.

In carrying out the above process, and others requiring digestion of crude cyanuric acid, it is found that cyanuric acid crystals harden on the filter or centrifuge screen into a cake of cement-like mass by the time the final water washing step is completed. This cake is of such hardness that it frequently breaks plow bits when removal and recovery of the mass is attempted. It is found further that these crystals become cemented within the small crevices of the filter chamber or centrifuge screen. As a result, the filter and screens become clogged, and normal filtering, washing, and recovery time has to be materially extended in order to obtain a commercially acceptable product. Further, mechanical removal of the crystals from within the screen or filter becomes impossible without breaking up the screen. Attempts have been made to prevent the rock-like cake of precipitated cyanuric acid from forming by altering crystallization techniques and by mechanical means, but no practical solution to the problem has been found which meets with commercial acceptance.

It is an object of the present invention to crystallize and purify cyanuric acid from its digestion liquor without the formation of a rock-like precipitaton within the filter or centrifuge.

These and other objects will be apparent from the following disclosure.

It has now been unexpectedly determined that pure cyanuric acid which is precipitated from an acid digesting solution can be recovered as a smooth-flowing crystal precipitate, free of any rock-like mass, by precipitating the cyanuric acid from the digestion solution and by water washing the resultant precipitate, providing that the cyanuric acid crystals are maintained at above about 57° C. when the acid concentration of the liquid in contact with the crystal mass drops below about 2 Normal. This is most conveniently carried out by washing the cyanuric acid crystals from the acid bath with water hot enough to maintain the temperature of the crystals above about 57° C.

In the process of the present invention, crude cyanuric acid containing ammelide is digested with a strong mineral acid, e.g. sulfuric, hydrochloric, hydrobromic, nitric, or phosphoric acid. Sulfuric and hydrochloric acids are preferred, for reasons of economy and ease of handling. The acids are employed in concentrations above about 2 Normal, with acid concentrations of about 5 Normal being preferred. Digestion is most generally carried out at the atmospheric boiling point of the acid solution, this being about 105° C. Higher temperatures, in the range of about 130° C., may be employed if superatmospheric pressures up to 100 p.s.i. are employed. Digestion is carried out for from one to ten hours, depending upon the temperatures of the acid path, with about four hours at 105° C. being preferred.

The digestion treatment operates in two distinct ways to yield pure cyanuric acid. It initially dissolves all acid-soluble impurities present in the reacton mxture. It further hydrolyzes ammelide to yield cyanuric acid and a corresponding ammonium salt, e.g. $(NH_4)_2SO_4$. Additionally, any ammonium compounds such as ammonium cyanurate are hydrolyzed to form cyanuric acid and a corresponding ammonium salt. At the conclusion of the digestion period the acid solution normally contains about 25% by weight cyanuric acid.

The present procedure prevents the precipitated cyanuric acid crystals from being converted into a rock-like mass because cyanuric acid is maintained in anhydrous crystalline form. It has been unexpectedly found that cyanuric acid crystals exist in both an anhydrous form and a hydrated form and that the hydrated form of the cyanuric acid crystal exists only in solutions at acid concentrations below about 2 Normal and at temperatures below about 57° C. If both the acid concentration and the temperature of the crystallized cyanuric acid are decreased below the above-defined limits, the large anhydrous cyanuric acid crystals commence converting to the hydrated form at the points of contact between the crystals. The transition occurs at an extremely rapid rate and results in the complete conversion of the anhydrous form within a few minutes.

As a result, if cyanuric acid crystals which are in acid solutions having concentrations above about 2 Normal are washed with water at temperatures below 57° C., conversion of the anhydrous crystalline form takes place. This occurs because wash water removes the acid medium from the crystals and decreases the acid concentration of the surrounding liquor to below 2 Normal, with the result that sections of the large anhydrous crystals which are in contact with each other commence to hydrate at the points of contact. There immediately begins a hardening, cementing action which forms a rock-like mass due to the bonding of the anhydrous cyanuric acid crystals by monohydrate crystal formation between these anhydrous crystals. The amount of crystalline conversion of the anhydrous form to the hydrate form need not be extensive in order to provide this rock-like mass. It only requires that sufficient anhydrous crystals be converted to the hydrate form at their points of contact with each other; this results in a cementing action by the hydrate crystal of sufficient strength to solidify the anhydrous cyanuric acid crystals into a rock-like mass.

In the preferred embodiment of the present invention, the acid digestion solution is cooled from about 105° C. to about 70° C., but in all cases substantially above 57° C., to precipitate a first yield of cyanuric acid crystals. The solution is either filtered or centrifuged at this temperature with the recovery of about 80% of the cyanuric acid on the filter. The first yield of cyanuric acid crystals is then washed with water maintained at a temperature of about 70° C., but in all cases above 57° C. to give pure and free-flowing cyanuric acid crystals. The recovered supernatant acid liquor which is maintained separate from the wash water is then cooled to about 5° C. and additional cyanuric acid crystallized from the acid digestion solution. A second yield of cyanuric acid crystals is separated from the filtrate and constitutes an additional 15% yield of cyanuric acid. The acid filtrate may be partially recycled if a continuous process is contemplated. The second yield of cyanuric acid crystals at a temperature of 5° C. is not washed with water; it is recovered by being recycled to a succeeding batch of hot digestion liquor. This permits the anhydrous crystal to be heated through the transition temperature in an acid solution of sufficient strength without converting to the hydrated form. In the event a continuous process is desired, the second yield of cyanuric acid crystals would be recycled into the hot digestion liquor maintained in the digestion tank. The second yield of anhydrous cyanuric acid crystals is thus recovered in subsequent filtrations as recycled product.

An alternate method of crystallizing and purifying cyanuric acid from the acid digestion liquor is accomplished by cooling the acid liquor from about 105° C. to about 30° C. The anhydrous cyanuric acid crystals which precipitate are then filtered with a recovery of about 90% cyanuric acid. The anhydrous cyanuric acid crystals are then heated by indirect heating means, or alternately by non-aqueous direct heating means to above the transition temperature of the anhydrous crystal. These heated crystals are then washed with water which is at about 70° C., but in all cases above the transition temperature of 57° C. to give pure and free-flowing cyanuric acid.

The present process is extremely economical since the preferred embodiment requires no additional equipment and no additional reactants. By the simple expedient of close temperature control, the transition of cyanuric acid crystals can be regulated to prevent the conversion of the easily handled anhydrous form to the undesirable hydrated form.

The alternate procedure which has been suggested additionally requires no additional reactants nor equipment except for heating means required to raise the temperature of the crystals after being filtered.

The following examples are given to illustrate the principle of the invention but are not deemed limitative of it.

*Example 1*

A crude sample of cyanuric acid containing about 25% ammelide was digested in 5 Normal (21% by weight) sulfuric acid. The solution contained about 25% by weight cyanuric acid. The solution was boiled for about 15 minutes and then cooled to room temperature with mild agitation. The cyanuric acid crystals which precipitated were not observed to change form during the cooling. The mixture was filtered in three portions. The first portion was filtered on a glass disc filter; the crystals were found to be anhydrous cyanuric acid. The second portion was filtered on filter paper and washed only with 5 Normal sulfuric acid; the crystals were anhydrous cyanuric acid. The third portion was also filtered on paper but was washed with cold water; the crystals were almost entirely hydrated cyanuric acid.

*Example 2*

A solution containing 510 gallons of water, 2030 lbs. of crude cyanuric acid, and 250 gallons of 36% hydrochloric acid were charged into a 1000 gallon, glass-lined, agitated, steam-jacketed reactor. The mixture was refluxed at about 104° C. after four hours. The mixture was then cooled to 70° C. and the purified cyanuric acid crystals were filtered from the slurry on a 48 inch, rubber-covered, suspended basket centrifuge. The cyanuric acid was recovered using three centrifuge cycles. Each centrifuge load was washed with 400 gallons of 70° C. water. The time required for each centrifuging cycle was 27 minutes for centrifuging, 39 minutes for washing, and 30 minutes for cake removal. The total time required to recover the cyanuric acid in the entire batch was 5 hours. Removal of the cake in the centrifuge was extremely easy, as was separation of the cyanuric acid cake. A 99% pure product was recovered.

*Example 3*

A solution identical to that made up in Example 2 was refluxed for four hours at 104° C. The mixture was cooled to 40° C. and centrifuged in the same equipment employed in Example 2. The cyanuric acid required four centrifuge cycles. Each centrifuge load was washed with 400 gallons of 20° C. water. The time required for each centrifuge cycle was 120 minutes for centrifuging, 93 minutes for washing, and 60 minutes for cake removal. The total time required to recover the cyanuric acid in the entire batch was 20 hours. The centrifuged cake set up into a hard mass which was difficult to separate, even with the use of mechanical plows.

*Example 4*

The supernatant mother liquor recovered from the centrifuge of Example 2 was cooled to 5° C. The cyanuric acid crystals which precipitated were recovered in a second centrifuge operation, without being washed with water. The crystals were anhydrous cyanuric acid, and constituted an additional 2.98% by weight of cyanuric acid from the mother liquor. The mother liquor which was discarded contained about 1.2 weight percent of cyanuric acid in solution.

Example 1 demonstrates the necessity for washing the cyanuric acid crystals with water which is above the transition point, i.e., above about 57° C., if the hydrated form of cyanuric acid is to be avoided. This example further demonstrates that the anhydrous cyanuric acid crystal can be maintained at below the transition temperature, provided that it is only washed with an acid solution of about 2 Normal or stronger.

Examples 2 and 3 demonstrate the plant difficulty encountered in recovering hydrated cyanuric acid vis-a-vis anhydrous cyanuric acid. It should be noted that the anhydrous form of cyanuric acid required only 5 hours of plant operation to yield a pure product, while the hydrated form of cyanuric acid required 20 hours to recover the same amount of product, with the same equipment.

Example 4 has been included to demonstrate a second recovery of cyanuric acid from the mother liquor. One of the drawbacks of filtering at higher temperatures is the increased solubility of the cyanuric acid in the hotter liquor. This example demonstrates how additional cyanuric acid can be recovered, without having this secondary yield set up as a hydrated cyanuric acid mass.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. In the method of recovering cyanuric acid from an acid digestion bath which comprises cooling the digestion acid to precipitate anhydrous cyanuric acid crystals, separating a filter cake of said crystals from said digestion acid and washing said crystals with water at ambient temperatures to remove residual impurities, the improvement which comprises maintaining the temperature of said crystals at above about 57° C., washing said crystals with hot water at a temperature above about 57° C., and removing cyanuric acid in a free-flowing anhydrous crystalline form free of any rock-like formations from the crystal separator.

2. In the method of recovering cyanuric acid from an acid digestion bath which comprises cooling the digestion acid to precipitate anhydrous cyanuric acid crystals, separating a filter cake of said crystals from said digestion acid and washing said crystals with water at ambient temperatures to remove residual impurities, the improvement which comprises cooling the digestion acid to a temperature above about 57° C. to precipitate anhydrous cyanuric acid crystals, separating a filter cake of said crystals from said digestion acid, maintaining the temperature of said separated crystals at above about 57° C., washing said crystals with hot water at a temperature of above about 57° C., and removing cyanuric acid in a free-flowing anhydrous crystalline form free of any rock-like formations from the crystal separator.

3. The process of claim 2 wherein said separated digestion acid is cooled to about 5° C. to precipitate a second yield of anhydrous cyanuric acid crystals, separating a filter cake of said second yield of anhydrous cyanuric acid crystals from said cooled digestion acid, heating said second yield of anhydrous cyanuric acid crystals to a temperature above about 57° C., washing said heated crystals with hot water at a temperature of above about 57° C., and removing said free-flowing anhydrous crystalline cyanuric acid from the crystal separator.

4. The process of claim 3 which is carried out in a continuous process, wherein said separated second yield of anhydrous cyanuric acid is recycled back to digestion acid maintained in the acid digestion bath at a temperature of above about 57° C.

5. In the method of recovering cyanuric acid from an acid digestion bath which comprises cooling the digestion acid to precipitate anhydrous cyanuric acid crystals, separating a filter cake of said crystals from said digestion acid and washing said crystals with water at ambient temperatures to remove residual impurities, the improvement which comprises cooling the digestion acid to a temperature below about 57° C. to precipitate anhydrous cyanuric acid crystals, separating a filter cake of said crystals from said digestion acid, heating said crystals to a temperature above about 57° C., washing said heated crystals with hot water at a temperature above about 57° C. and removing cyanuric acid in a free-flowing anhydrous crystalline form free of any rock-like formations from the crystal separator.

6. The process of claim 1 wherein said crystals are maintained at a temperature of about 70° C., and wherein said wash water is at a temperature of about 70° C.

7. The process of claim 5, wherein said digestion acid is cooled to about 5° C. to precipitate said anhydrous cyanuric acid crystals.

References Cited in the file of this patent

UNITED STATES PATENTS 3,057,918    Formaini et al. _____ Oct. 9, 1962

FOREIGN PATENTS 578,398    Canada _____ June 23, 1959

OTHER REFERENCES

De Vry: "Annalen der Chemie," volume 61, 1847, pages 248–50.

Von Walther: "Journal für Praktische Chemie," volume N.F. 79, 1909, pages 126–28.

Smolin et al.: "s-Triazines and Derivatives," published by Interscience Publ. Inc., New York, 1959, page 21.